(12) United States Patent
Zhong et al.

(10) Patent No.: US 11,481,927 B2
(45) Date of Patent: Oct. 25, 2022

(54) METHOD AND APPARATUS FOR DETERMINING TEXT COLOR

(71) Applicant: BEIJING BAIDU NETCOM SCIENCE AND TECHNOLOGY CO., LTD., Beijing (CN)

(72) Inventors: Ziyan Zhong, Beijing (CN); Yu Hao, Beijing (CN); Rong Cheng, Beijing (CN); Muwei Zhao, Beijing (CN); Wenqian Yuan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 181 days.

(21) Appl. No.: 16/722,302

(22) Filed: Dec. 20, 2019

(65) Prior Publication Data

US 2020/0410718 A1 Dec. 31, 2020

(30) Foreign Application Priority Data

Jun. 27, 2019 (CN) .......................... 201910565932.3

(51) Int. Cl.
*G06T 11/00* (2006.01)
*G06T 7/90* (2017.01)
*G06V 30/40* (2022.01)

(52) U.S. Cl.
CPC .............. *G06T 7/90* (2017.01); *G06T 11/001* (2013.01); *G06V 30/40* (2022.01)

(58) Field of Classification Search
CPC ..... G06T 7/90; G06T 11/001; G06K 9/00442; G06K 9/4647; G06K 9/38; G06K 9/4652;
(Continued)

(56) References Cited

U.S. PATENT DOCUMENTS 7,064,759 B1 * 6/2006 Feierbach ............... G06T 11/60
382/268
2007/0283246 A1 * 12/2007 Wake .................... G06F 40/154
715/234

(Continued)

FOREIGN PATENT DOCUMENTS

JP 2010244223 A 10/2010
JP 2012133195 A 7/2012
(Continued)

OTHER PUBLICATIONS

Japanese Patent Application No. 2019-230485, First Office Action dated May 25, 2021, 3 pages.

*Primary Examiner* — Vu Le
*Assistant Examiner* — Winta Gebreslassie
(74) *Attorney, Agent, or Firm* — Lathrop GPM LLP

(57) ABSTRACT

Embodiments of the present disclosure relate to a method and apparatus for determining a text color. The method may include: determining, in response to detecting a text frame on canvas, a subimage corresponding to the text frame from the canvas; acquiring color values of pixels in the subimage, to determine an average color value of the subimage; determining an average luminance value of the subimage based on the average color value of the subimage; and determining a color of text to be inputted into the text frame based on the average luminance value of the subimage.

18 Claims, 6 Drawing Sheets

(58) Field of Classification Search
CPC . G06K 9/00456; G06F 40/109; G06F 40/126; G06F 40/143
See application file for complete search history.

(56) References Cited

U.S. PATENT DOCUMENTS

| | | | |
|---|---|---|---|
| 2008/0193048 A1* | 8/2008 | Sun | G06T 11/60 382/284 |
| 2009/0257678 A1* | 10/2009 | Chen | G09G 5/10 382/274 |
| 2010/0215261 A1* | 8/2010 | Kim | G06V 10/50 382/165 |
| 2011/0016426 A1* | 1/2011 | Grosz | H04N 1/387 715/821 |
| 2013/0129139 A1* | 5/2013 | Egorova | G06T 11/00 382/100 |
| 2014/0362105 A1 | 12/2014 | Kocienda et al. | |
| 2016/0343155 A1* | 11/2016 | Reeves | G06T 11/206 |
| 2019/0057255 A1* | 2/2019 | Kuo | G06K 9/623 |

FOREIGN PATENT DOCUMENTS

| | | |
|---|---|---|
| JP | 2013123119 A | 6/2013 |
| WO | WO 2007/028137 A2 | 3/2007 |

\* cited by examiner

METHOD AND APPARATUS FOR DETERMINING TEXT COLOR

CROSS-REFERENCE TO RELATED APPLICATIONS

This application claims priority to Chinese Application No. 201910565932.3, filed on Jun. 27, 2019 and entitled "Method and Apparatus for Determining Text Color," the entire disclosure of which is hereby incorporated by reference.

TECHNICAL FIELD

Embodiments of the present disclosure relate to the field of computer technology, and specifically to a method and apparatus for determining a text color.

BACKGROUND

With the popularity of mobile phones, computers, and other electronic devices, people use more and more design tools (e.g., Photoshop, and PowerPoint) in their work and life. For design tools, during text display, there is often a problem that the contrast between canvas and font color is not bright enough, such that it may be very difficult for users to distinguish text from the canvas.

In the related art, the users of the design tools (e.g., Photoshop, and PowerPoint) generally may manually adjust the font color to enhance the contrast between the canvas and the text.

SUMMARY

Embodiments of the present disclosure propose a method and apparatus for determining a text color.

In a first aspect, an embodiment of the present disclosure provides a method for determining a text color, including: determining, in response to detecting a text frame on canvas, a subimage corresponding to the text frame from the canvas; acquiring color values of pixels in the subimage, to determine an average color value of the subimage; determining an average luminance value of the subimage based on the average color value of the subimage; and determining a color of text to be inputted into the text frame based on the average luminance value of the subimage.

In some embodiments, before the acquiring color values of pixels in the subimage, the method further includes: acquiring element information of a DOM node of the subimage to generate an XML document; creating a SVG template of a specified size, wherein the specified size is a size of the subimage; and analyzing the XML document using the XML document as content of the SVG template, to generate a vectorgraph of the subimage.

In some embodiments, the method further includes: creating canvas of the specified size; and plotting the vectorgraph onto the created canvas to acquire the color values of the pixels in the subimage.

In some embodiments, the determining a color of text to be inputted into the text frame based on the average luminance value of the subimage includes: acquiring a preset contrast, wherein the contrast is a contrast between the text and the subimage; determining a luminance value of the text based on the average luminance value of the subimage and the contrast; and determining a gray value of the text based on the determined luminance value of the text.

In some embodiments, the determining a color of text to be inputted into the text frame based on the average luminance value of the subimage includes: setting, in response to determining the average luminance value of the subimage being greater than a preset threshold, the color of the text to be inputted into the text frame as black; and setting, in response to determining the average luminance value of the subimage being less than or equal to the preset threshold, the color of the text to be inputted into the text frame as white.

In some embodiments, the determining a subimage corresponding to the text frame from the canvas includes: determining a position of at least one vertex of the text frame on the canvas; acquiring a length and a width of the text frame; and determining the subimage from the canvas based on the determined position of the at least one vertex, the length, and the width.

In a second aspect, an embodiment of the present disclosure provides an apparatus for determining a text color, the apparatus including: a subimage determining unit configured to determine, in response to detecting a text frame on canvas, a subimage corresponding to the text frame from the canvas; an acquiring unit configured to acquire color values of pixels in the subimage, to determine an average color value of the subimage; an average luminance value determining unit configured to determine an average luminance value of the subimage based on the average color value of the subimage; and a color determining unit configured to determine a color of text to be inputted into the text frame based on the average luminance value of the subimage.

In some embodiments, the apparatus further includes: a document generating unit configured to acquire element information of a DOM node of the subimage to generate an XML document; a template creating unit configured to create an SVG template of a specified size, wherein the specified size is a size of the subimage; and a vectorgraph generating unit configured to analyze the XML document using the XML document as content of the SVG template, to generate a vectorgraph of the subimage.

In some embodiments, the apparatus further includes: a canvas creating unit configured to create canvas of the specified size; and a plotting unit configured to plot the vectorgraph onto the created canvas to acquire the color values of the pixels in the subimage.

In some embodiments, the color determining unit is configured to: acquire a preset contrast, wherein the contrast is a contrast between the text and the subimage; determine a luminance value of the text based on the average luminance value of the subimage and the contrast; and determine a gray value of the text based on the determined luminance value of the text.

In some embodiments, the color determining unit is further configured to: set, in response to determining the average luminance value of the subimage being greater than a preset threshold, the color of the text to be inputted into the text frame as black; and set, in response to determining the average luminance value of the subimage being less than or equal to the preset threshold, the color of the text to be inputted into the text frame as white.

In some embodiments, the subimage determining unit is further configured to: determine a position of at least one vertex of the text frame on the canvas; acquire a length and a width of the text frame; and determine the subimage from the canvas based on the determined position of the at least one vertex, the length, and the width.

The method and apparatus for determining a text color according to embodiments of the present disclosure determine, in response to detecting a text frame on canvas, a subimage corresponding to the text frame from the canvas, then acquire color values of pixels in the subimage, to determine an average color value of the subimage, then determine an average luminance value of the subimage based on the average color value of the subimage, and finally determine a color of text to be inputted into the text frame based on the average luminance value of the subimage, thereby achieving automatically matching the text color adapted for the canvas, and enhancing the text display effect.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
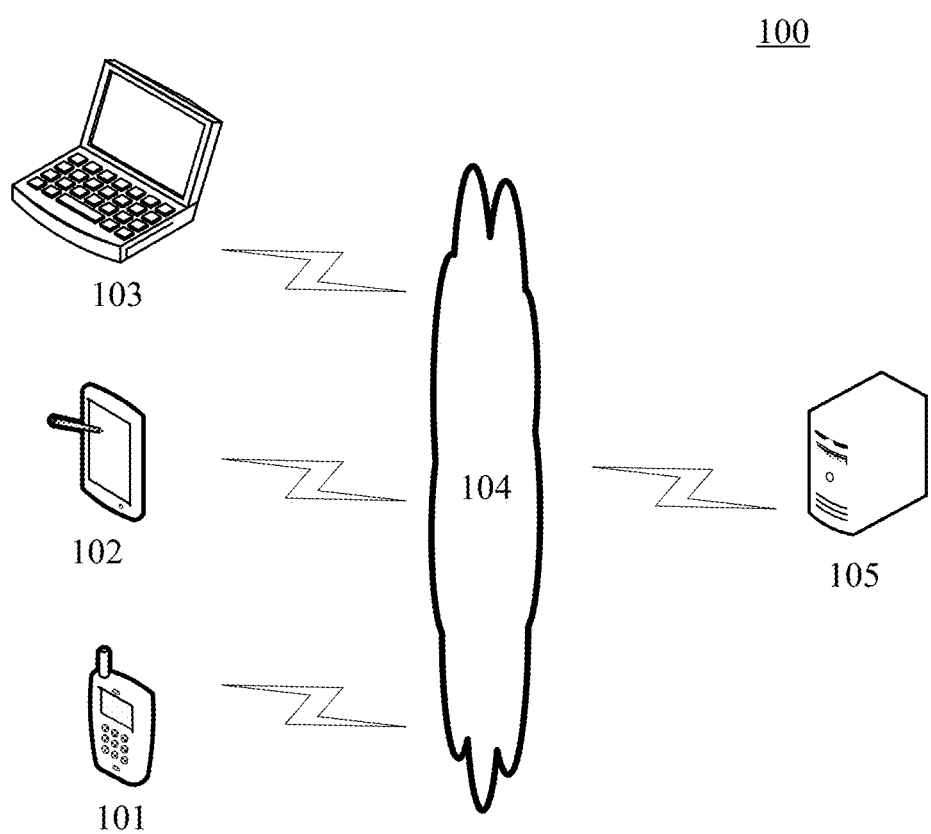
FIG. 1 is a diagram of an example system architecture in which embodiments of the present disclosure may be implemented.

FIG. 1 shows an example system architecture 100 in which a method for determining a text color or an apparatus for determining a text color of embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103, and the server 105. The network 104 may include various types of connections, such as wired or wireless communication links, or optical cables.

A user may interact with the server 105 using the terminal devices 101, 102, 103 via the network 104, for example, to receive or send information. The terminal devices 101, 102, 103 may be provided with various client applications, such as a design tool, an image processing application, a web browser application, a shopping application, a search application, an instant messaging tool, an email client, or social platform software.

The terminal devices 101, 102, 103 may be hardware or software. When the terminal devices 101, 102, 103 are hardware, the terminal devices may be various electronic devices having display screens and supporting text display, including but not limited to smart phones, tablet computers, e-book readers, laptop portable computers, desktop computers, or the like. When the terminal devices 101, 102, and 103 are software, the terminal devices may be installed in the above-listed electronic devices, may be implemented as, e.g., a plurality of software programs or software modules for providing distributed services, or may be implemented as an individual software program or software module. This is not specifically limited here.

The server 105 may be a server providing various services, such as a back-end server providing support for a design application running on the terminal devices 101, 102, 103. The back-end server may determine a color of text to be inputted into a text frame by processing, e.g., data analysis, of canvas, the text frame, or the like in the design tool, and return the processing result (e.g., the text of the determined color) to the terminal devices.

It should be noted that the method for determining a text color according to some embodiments of the present disclosure is generally executed by the servers 105, or may also be executed by the terminal devices 101, 102, and 103. Accordingly, the apparatus for determining a text color is generally provided in the server 105, or may also be provided in the terminal devices 101, 102, and 103.

It should be noted that the server may be hardware or software. When the server is hardware, the server may be implemented as a distributed server cluster composed of a plurality of servers, or be implemented as a single server. When the server is software, the server may be implemented as a plurality of software programs or software modules, or be implemented as a single software program or software module. This is not specifically limited here.

It should be understood that the numbers of terminal devices, networks, and servers in FIG. 1 are merely illustrative. Any number of terminal devices, networks, and servers may be provided based on actual requirements.

Figure 2:
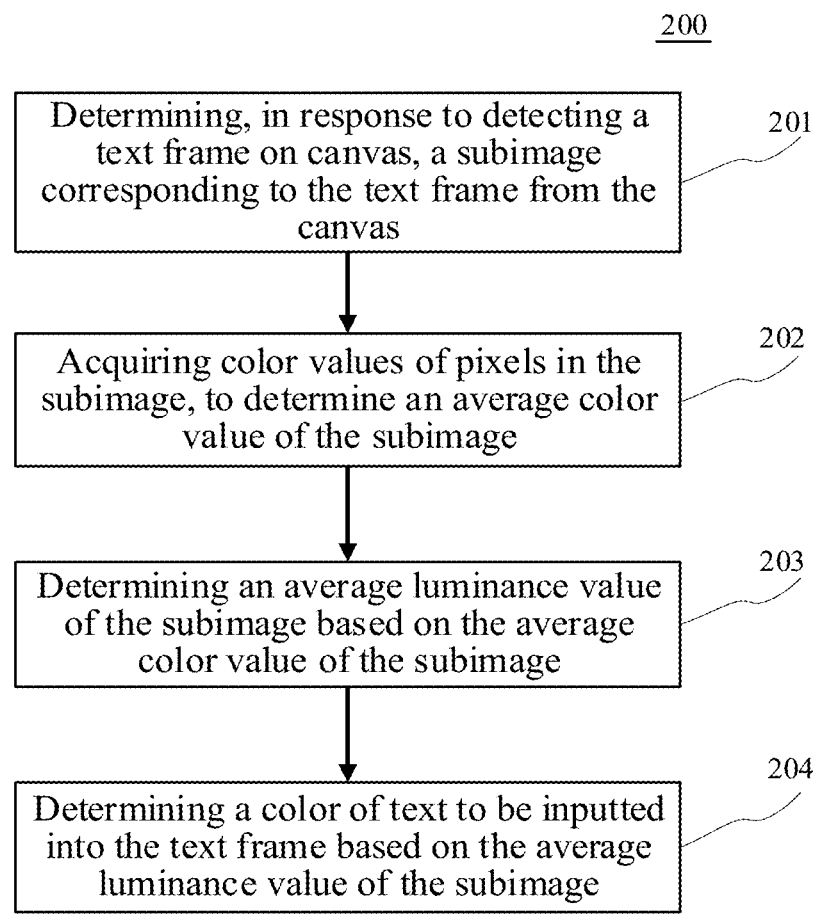
FIG. 2 is a flowchart of a method for determining a text color according to an embodiment of the present disclosure.

Referring to FIG. 2, a process 200 of a method for determining a text color according to an embodiment of the present disclosure is shown. The method for determining a text color includes the following steps.

Step 201: determining, in response to detecting a text frame on canvas, a subimage corresponding to the text frame from the canvas.

In the present embodiment, before inputting text using a design tool (e.g., Photoshop), a user often needs to set the text frame for inputting the text on the canvas of the design tool. An executing body (e.g., the server shown in FIG. 1) of the method for determining a text color may detect whether the user sets the text frame on the canvas of the employed design tool from a terminal with which the user inputs the text through a wired connection or wireless connection. In response to detecting the text frame on the canvas, the executing body may determine a subimage corresponding to the text frame from the canvas.

In some alternative implementations of the present embodiment, the executing body may determine a position corresponding to each vertex of the text frame on the canvas, and then determine an image corresponding to the text frame. The image is the subimage corresponding to the text frame in the canvas. Alternatively, the executing body may further determine a position corresponding to an vertex of the text frame on the canvas; then acquire a length and a width of the text frame; and finally determine an image corresponding to the text frame in the canvas based on the determined position of the vertex and the length and the width of the text frame. The image is the subimage corresponding to the text frame in the canvas.

Step 202: acquiring color values of pixels in the subimage, to determine an average color value of the subimage.

In the present embodiment, the canvas may be a pure color, or a gradient color or a combination of images. Thus, the color values of pixels in the subimage may be identical or different. The executing body may acquire the color value of each pixel of the subimage based on the subimage acquired in step 201 by various approaches. As an example, the executing body may input the subimage into an existing image color value reading tool to read the color value of each pixel in the subimage. Finally, after acquiring the color value of each pixel in the subimage, the executing body may compute an average value of the color values of the pixels, thereby determining the average color value of the subimage.

Step 203: determining an average luminance value of the subimage based on the average color value of the subimage.

In the present embodiment, based on the average color value of the subimage determined in step 202, the executing body may determine the average luminance value of the subimage using the average color value of the subimage. As an example, the executing body may acquire a color value of a RGB color space of each pixel of the subimage, and then convert the color value of the RGB space into a color value of a $YC_bC_r$ color space, thereby obtaining a luminance component Y, a blue chrominance component $C_b$ and a red chrominance component $C_r$ of the subimage in the $YC_bC_r$ color space, where the luminance component Y may be considered as the average luminance value of the subimage.

Step 204: determining a color of text to be inputted into the text frame based on the average luminance value of the subimage.

In the present embodiment, the executing body may determine the color of the text to be inputted into the text frame based on the average luminance value of the subimage determined in step 203 by various approaches. For example, the text to be inputted into the text frame may be first set as any luminance value, and in response to determining a contrast between the subimage and the text failing to reach a preset contrast, a luminance value range of the image composed of the subimage and the text is stretched or compressed based on the set average luminance value of the subimage to improve the contrast of the image, thus determining a luminance value of the text and a color corresponding to the luminance value.

As an example, in the case where the average luminance vale of the subimage is 0 (i.e., the subimage is a black image), and a gray value of text inputted into the text frame is 255 (i.e., the text color is white), the contrast between the subimage and the text is high, and the display effect of the text is better. Similarly, in the case where the average luminance value of the subimage is 255 (i.e., the subimage is a white image), and the gray value of the text inputted into the text frame is 0 (i.e., the text color is black), the display effect of the text is also very good. It will be appreciated that the color of the above subimage is not merely limited to white or black, and similarly, the color of the text inputted into the text frame is not merely limited to black or white, either, and may further be a color corresponding to other gray values.

In some alternative implementations of the present embodiment, the executing body may further detect whether the canvas is replaced in real time. If the canvas is replaced, then the executing body may reset the color of the text to be inputted into the text frame. Specifically, the executing body may reexecute the above step 201 to step 204 to reset the color of the text to be inputted into the text frame.

Compared with the related art, when the user inputs the text using the design tool, the method for determining a text color according to the present embodiment may automatically determine the text color adapted for the canvas, thereby enhancing the display effect of the text on the canvas. At the same time, the method for determining a text color according to the present embodiment avoids manually adjusting the text color adapted for the canvas by the user, and improving the efficiency of text color matching.

Figure 3:
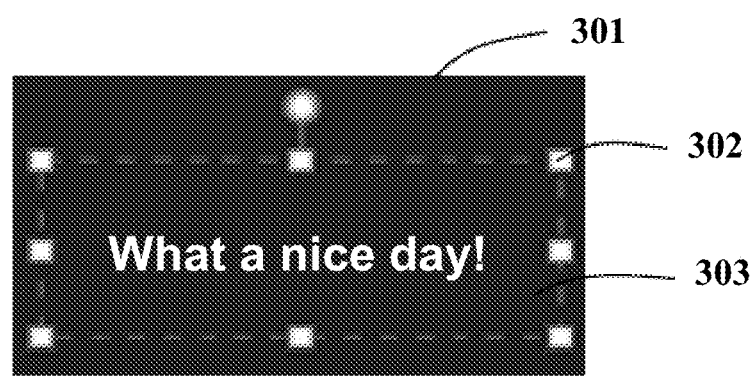
FIG. 3 is a schematic diagram of an application scenario of the method for determining a text color according to an embodiment of the present disclosure.

Further referring to FIG. 3, FIG. 3 is a schematic diagram of an application scenario of the method for determining a text color according to the present embodiment. In the application scenario of FIG. 3, before inputting text using a design tool, a user may add a text frame 302 for inputting text to canvas 301 of the design tool; in response to detecting the text frame 302 being present on the canvas 301, a back-end server may determine a subimage 303 corresponding to the text frame 301 from the canvas 301 (corresponding canvas within a dotted line of the text frame 302); then the back-end server may acquire color values of pixels in the subimage 303, such that the back-end server may determine an average color value of the subimage 303; then the back-end server may determine an average luminance value of the subimage 303 based on the average color value of the subimage 303; and finally the back-end server may determine a color of text to be inputted into the text frame 301 based on the average luminance value of the subimage 303. In this case, the user may input the text of the determined color into the text frame 302. As shown in FIG. 3, a contrast between a color of text "What a nice day!" inputted into the text frame 302 and the canvas is high, and the display effect of the text is better. Thus it can be seen that, the method for determining a text color according to the present embodiment achieves the purpose of automatically enhancing the display effect of the text on the canvas, avoids manually adjusting the text color by the user, and improves the efficiency of text color matching.

The method for determining a text color according to above embodiments of the present disclosure determines, in response to detecting a text frame on canvas, a subimage corresponding to the text frame from the canvas, then acquires color values of pixels in the subimage, to determine an average color value of the subimage, then determines an average luminance value of the subimage based on the average color value of the subimage, and finally determines a color of text to be inputted into the text frame based on the average luminance value of the subimage, thereby achieving automatically matching the text color adapted for the canvas, and enhancing the display effect of the text.

Figure 4:
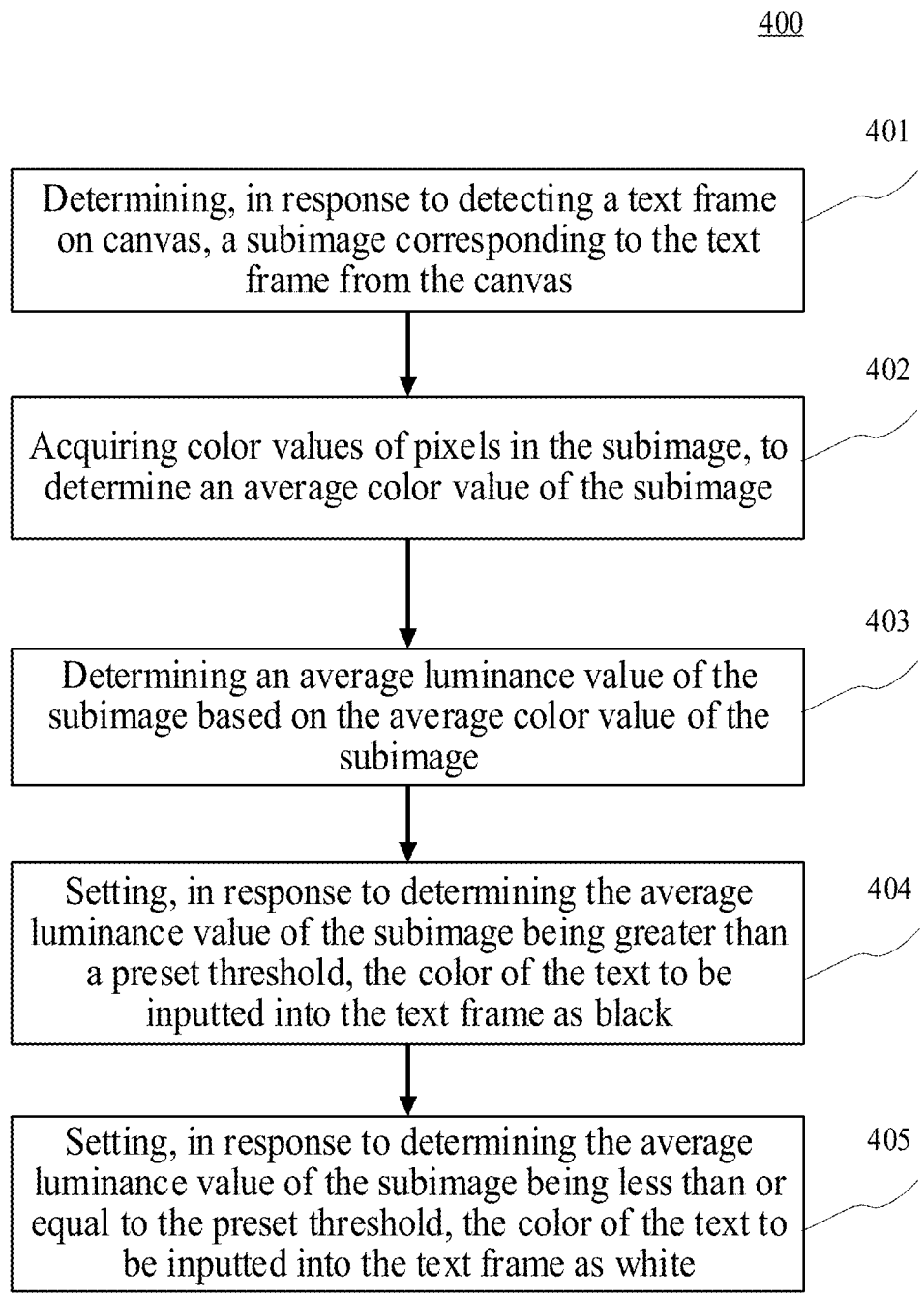
FIG. 4 is a flowchart of the method for determining a text color according to another embodiment of the present disclosure.

Further referring to FIG. 4, a process 400 of a method for determining a text color according to another embodiment is shown. The process 400 of the method for determining a text color includes the following steps.

Step 401: determining, in response to detecting a text frame on canvas, a subimage corresponding to the text frame from the canvas.

In the present embodiment, before inputting text using a design tool (e.g., Photoshop), a user often needs to set the text frame for inputting the text on the canvas of the design tool. An executing body (e.g., the server shown in FIG. 1) of the method for determining a text color may detect whether the user sets the text frame on the canvas of the employed design tool from a terminal with which the user inputs the text through a wired connection or wireless connection. In response to detecting the text frame on the canvas, the executing body may determine a subimage corresponding to the text frame from the canvas.

In some alternative implementations of the present embodiment, before acquiring color values of pixels in the subimage, the executing body may further execute the following steps: acquiring element information of a DOM node of the subimage to generate an XML document; creating a SVG template of a specified size, where the specified size is a size of the subimage; and analyzing the XML document using the XML document as content of the SVG template, to generate a vectorgraph of the subimage. Specifically, the executing body may traverse DOM nodes in the subimage, and then serializes the acquired DOM nodes into an XML document; then define the SVG template of the specified size (i.e., setting a length and a width of a SVG graph as the length and the width of the subimage respectively), and determine the SVG template being contained within a foreignObject tag; and finally set the above XML document as the content of the SVG template, and analyze the XML document to generate the SVG graph. The graph is the vectorgraph of the subimage. Accordingly, the executing body may acquire a color attribute of the generated vectorgraph of the subimage, thus acquiring the color values of the pixels in the subimage. In some alternative implementations of the present embodiment, the executing body may further create canvas of a specified size. A height and a width of the canvas may be identical to a height and a width of the subimage respectively. Then, the executing body may further plot the vectorgraph of the subimage onto the created canvas, such that the executing body may directly return the color values of the pixels in the subimage by getImageData, which is easier.

Step 402: acquiring color values of pixels in the subimage, to determine an average color value of the subimage.

In the present embodiment, the canvas may be a pure color, or a gradient color or a combination of images. Thus, the color values of pixels in the subimage may be identical or different. The executing body may acquire the color value of each pixel of the subimage based on the subimage acquired in step 401 by various approaches. As an example, the executing body may input the subimage into an existing image color value reading tool to read the color value of each pixel in the subimage. Finally, after acquiring the color value of each pixel in the subimage, the executing body may compute an average value of the color values of the pixels, thereby determining the average color value of the subimage.

Step 403: determining an average luminance value of the subimage based on the average color value of the subimage.

In the present embodiment, based on the average color value of the subimage determined in step 402, the executing body may determine the average luminance value of the subimage using the average color value of the subimage. As an example, the executing body may acquire a color value of a RGB color space of each pixel of the subimage, and then convert the color value of the RGB space into a color value of a $YC_bC_r$ color space, thereby obtaining a luminance component Y, a blue chrominance component $C_b$ and a red chrominance component $C_r$ of the subimage in the $YC_bC_r$ color space, where the luminance component Y may be considered as the average luminance value of the subimage.

In some alternative implementations of the present embodiment, the average color value of the subimage obtained by the executing body may be the color value of the RGB space, including a red component R, a green component G, and a blue component B. The executing body may compute the average luminance value of the subimage through the following luminance value formula.

$L=0.2126 \times R+0.7152 \times G+0.0722 \times B$, where L is the average luminance value of the subimage, R is the red component of the average color value of the subimage, G is the green component of the average color value of the subimage, and B is the blue component of the average color value of the subimage. Here, the red component R, the green component G, and the blue component B of the average color value of the subimage may be converted color components, such that the executing body may normalize a luminance value of each color through the above luminance value formula. The obtained luminance value corresponding to black is 0, the obtained luminance value corresponding to white is 1, and the obtained luminance value corresponding to other colors is in the range of 0 to 1.

Step 404: setting, in response to determining the average luminance value of the subimage being greater than a preset threshold, the color of the text to be inputted into the text frame as black.

In the present embodiment, text in the text frame may be merely white or black. When the average luminance value of the subimage is large, the text may be set as black to increase the contrast between the subimage and the text. When the average luminance value of the subimage is small, the text may be set as white to increase the contrast between the subimage and the text. Therefore, the executing body may preset a preset threshold, compare the preset threshold with the average luminance value of the subimage, and set, in response to determining the average luminance value of the subimage being greater than the preset threshold, the color of the text to be inputted into the text frame as black.

Step 405: setting, in response to determining the average luminance value of the subimage being less than or equal to the preset threshold, the color of the text to be inputted into the text frame as white.

In the present embodiment, based on the preset threshold set in step 404, the executing body may set, in response to determining the average luminance value of the subimage being less than or equal to the preset threshold, the color of the text to be inputted into the text frame as white.

In some alternative implementations of the present embodiment, the contrast between the text and the subimage may be computed through the following formula.

Contrast=(L1+0.05)/(L2+0.05), where Contrast is the contrast between the text and the subimage, L1 is a relatively larger luminance value of the subimage and the text, and L2 is a relatively smaller luminance value of the subimage and the text. Thus, a luminance value may be reversely inferred from this formula, the contrast between the luminance value and white text is identical to the contrast between the luminance value and black text, and then the executing body may determine the luminance value as the above preset threshold. It will be appreciated that those skilled in the art may further provide the above preset threshold based on their experiences. Here, the preset threshold is not uniquely defined.

In some alternative implementations of the present embodiment, the user may further preset a contrast between the subimage and the color of the text to be inputted into the text frame, such that the executing body may acquire the contrast preset by the user. Then, the executing body may substitute the average luminance of the subimage and the acquired contrast into the above formula Contrast=(L1+ 0.05)/(L2+0.05), thus computing the luminance value of the text. Finally, the computed luminance value of the text is converted to determine a gray value of the text, and then determine the text color.

As can be seen from FIG. 4, the method for determining a text color in the present embodiment may directly determine whether the text color of the text to be inputted into the text frame is white or black by comparing the preset threshold with the average luminance value of the subimage. The method is simpler, and further improves the efficiency of setting the text color.

Figure 5:
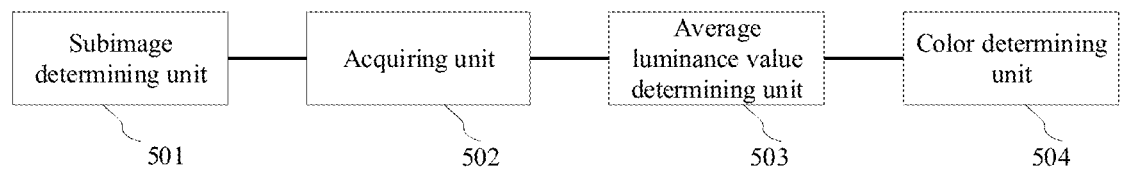
FIG. 5 is a schematic structural diagram of an apparatus for determining a text color according to an embodiment of the present disclosure.

Further referring to FIG. 5, as an implementation of the method shown in the above figures, an embodiment of the present disclosure provides an apparatus for determining a text color. An embodiment of the apparatus may correspond to the embodiment of the method shown in FIG. 2. The apparatus may be specifically applied to various executing bodies.

As shown in FIG. 5, the apparatus 500 for determining a text color of the present embodiment includes: a subimage determining unit 501, an acquiring unit 502, an average luminance value determining unit 503, and a color determining unit 504. The subimage determining unit 501 is configured to determine, in response to detecting a text frame on canvas, a subimage corresponding to the text frame from the canvas; the acquiring unit 502 is configured to acquire color values of pixels in the subimage, to determine an average color value of the subimage; the average luminance value determining unit 503 is configured to determine an average luminance value of the subimage based on the average color value of the subimage; and the color determining unit 504 is configured to determine a color of text to be inputted into the text frame based on the average luminance value of the subimage.

In the present embodiment, the subimage determining unit 501 may determine, in response to detecting a text frame on canvas, a subimage corresponding to the text frame from the canvas, then the acquiring unit 502 may acquire color values of pixels in the subimage, to determine an average color value of the subimage, then the average luminance value determining unit 503 may determine an average luminance value of the subimage based on the average color value of the subimage, and finally the color determining unit 504 may determine a color of text to be inputted into the text frame based on the average luminance value of the subimage, thereby achieving automatically matching the text color adapted for the canvas, and enhancing the text display effect.

In some alternative implementations of the present embodiment, the apparatus 500 for determining a text color further includes: a document generating unit configured to acquire element information of a DOM node of the subimage to generate an XML document; a template creating unit configured to create a SVG template of a specified size, where the specified size is a size of the subimage; and a vectorgraph generating unit configured to analyze the XML document using the XML document as content of the SVG template, to generate a vectorgraph of the subimage.

In some alternative implementations of the present embodiment, the apparatus 500 for determining a text color further includes: a canvas creating unit configured to create canvas of the specified size; and a plotting unit configured to plot the vectorgraph onto the created canvas to acquire the color values of the pixels in the subimage.

In some alternative implementations of the present embodiment, the color determining unit 504 is specifically configured to: acquire a preset contrast, where the contrast is a contrast between the text and the subimage; determine a luminance value of the text based on the average luminance value of the subimage and the contrast; and determine a gray value of the text based on the determined luminance value of the text.

In some alternative implementations of the present embodiment, the color determining unit 504 is further configured to: set, in response to determining the average luminance value of the subimage being greater than a preset threshold, the color of the text to be inputted into the text frame as black; and set, in response to determining the average luminance value of the subimage being less than or equal to the preset threshold, the color of the text to be inputted into the text frame as white.

In some alternative implementations of the present embodiment, the subimage determining unit 501 is further configured to: determine a position of at least one vertex of the text frame on the canvas; acquire a length and a width of the text frame; and determine the subimage from the canvas based on the determined position of the at least one vertex, the length, and the width.

The units disclosed in the apparatus 500 correspond to various steps in the method described in FIG. 2. Therefore, the operations and features described above for the method also apply to the apparatus 500 and the units included therein. The description will not be repeated here.

Figure 6:
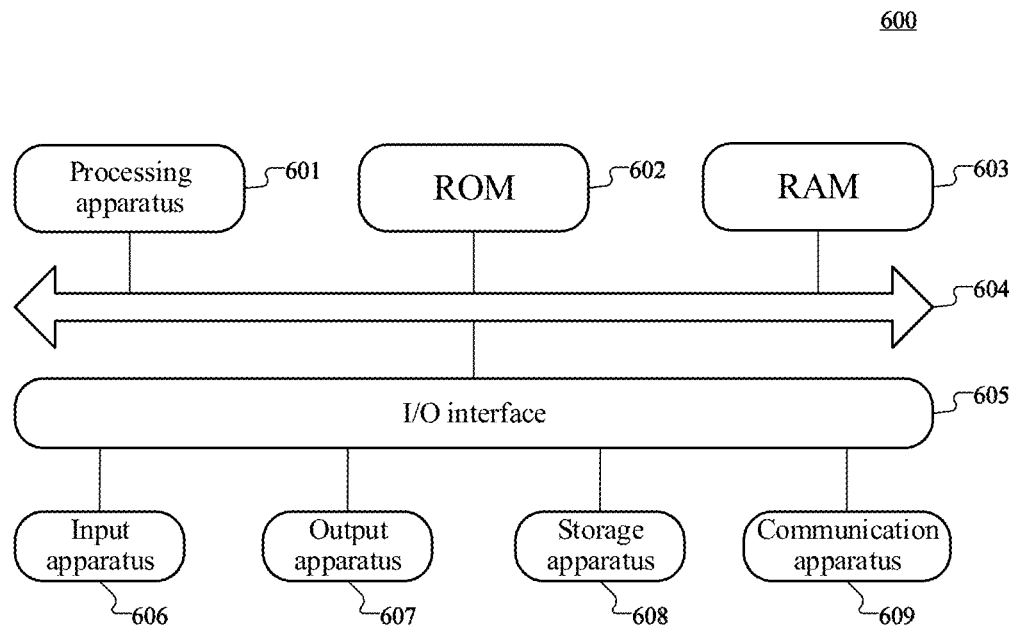
FIG. 6 is a schematic structural diagram of a computer system adapted to implement an electronic device of some embodiments of the present disclosure.

Referring to FIG. 6 below, a schematic structural diagram of an electronic device (e.g., the server in FIG. 1) 600 adapted to implement some embodiments of the present disclosure is shown. The electronic device shown in FIG. 6 is merely an example, and should not limit the functions and scope of use of embodiments of the present disclosure.

As shown in FIG. 6, the electronic device 600 may include a processing apparatus (e.g., a central processing apparatus, or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal displayer (LCD), a speaker, a vibrator, or the like; a storage apparatus 608 including a tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functions defined by the methods of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium without being assembled into the electronic device. The computer readable medium stores one or more programs. The one or more programs, when executed by the electronic device, cause the electronic device to: determining, in response to detecting a text frame on canvas, a subimage corresponding to the text frame from the canvas; acquiring color values of pixels in the subimage, to determine an average color value of the subimage; determining an average luminance value of the subimage based on the average color value of the subimage; and determining a color of text to be inputted into the text frame based on the average luminance value of the subimage.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including a subimage determining unit, an acquiring unit, an average luminance value determining unit, and a color determining unit. The names of the units do not constitute a limitation to such units themselves in some cases. For example, the subimage determining unit may be further described as "a unit configured to determine, in response to detecting a text frame on canvas, a subimage corresponding to the text frame from the canvas."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:
1. A method for determining a text color, comprising:
   determining, in response to detecting a text frame on canvas, a subimage corresponding to the text frame from the canvas;

acquiring color values of pixels in the subimage, to determine an average color value of the subimage;
determining an average luminance value of the subimage based on the average color value of the subimage;
determining a color of text to be inputted into the text frame based on the average luminance value of the subimage;
detecting whether the canvas is replaced in real time; and
resetting, in response to detecting the canvas being replaced, a color of the text to be inputted into the text frame.

2. The method according to claim 1, wherein before the acquiring color values of pixels in the subimage, the method further comprises:
acquiring element information of a DOM node of the subimage to generate an XML document;
creating a SVG template of a specified size, wherein the specified size is a size of the subimage; and
analyzing the XML document using the XML document as content of the SVG template, to generate a vectorgraph of the subimage.

3. The method according to claim 2, wherein the method further comprises:
creating canvas of the specified size; and
plotting the vectorgraph onto the created canvas to acquire the color values of the pixels in the subimage.

4. The method according to claim 1, wherein the determining a color of text to be inputted into the text frame based on the average luminance value of the subimage comprises:
acquiring a preset contrast, wherein the contrast is a contrast between the text and the subimage;
determining a luminance value of the text based on the average luminance value of the subimage and the contrast; and
determining a gray value of the text based on the determined luminance value of the text.

5. The method according to claim 1, wherein the determining a color of text to be inputted into the text frame based on the average luminance value of the subimage comprises:
setting, in response to determining the average luminance value of the subimage being greater than a preset threshold, the color of the text to be inputted into the text frame as black; and
setting, in response to determining the average luminance value of the subimage being less than or equal to the preset threshold, the color of the text to be inputted into the text frame as white.

6. The method according to claim 1, wherein the determining a subimage corresponding to the text frame from the canvas comprises:
determining a position of at least one vertex of the text frame on the canvas;
acquiring a length and a width of the text frame; and
determining the subimage from the canvas based on the determined position of the at least one vertex, the length, and the width.

7. An apparatus for determining a text color, comprising:
at least one processor; and
a memory storing instructions, the instructions when executed by the at least one processor, cause the at least one processor to perform operations, the operations comprising:
determining, in response to detecting a text frame on canvas, a subimage corresponding to the text frame from the canvas;
acquiring color values of pixels in the subimage, to determine an average color value of the subimage;
determining an average luminance value of the subimage based on the average color value of the subimage;
determining a color of text to be inputted into the text frame based on the average luminance value of the subimage;
detecting whether the canvas is replaced in real time; and
resetting, in response to detecting the canvas being replaced, a color of the text to be inputted into the text frame.

8. The apparatus according to claim 7, wherein the operations further comprises:
acquiring element information of a DOM node of the subimage to generate an XML document;
creating an SVG template of a specified size, wherein the specified size is a size of the subimage; and
analyzing the XML document using the XML document as content of the SVG template, to generate a vectorgraph of the subimage.

9. The apparatus according to claim 8, wherein the operations further comprises:
creating canvas of the specified size; and
plotting the vectorgraph onto the created canvas to acquire the color values of the pixels in the subimage.

10. The apparatus according to claim 7, wherein the determining a color of text to be inputted into the text frame based on the average luminance value of the subimage comprises:
acquiring a preset contrast, wherein the contrast is a contrast between the text and the subimage;
determining a luminance value of the text based on the average luminance value of the subimage and the contrast; and
determining a gray value of the text based on the determined luminance value of the text.

11. The apparatus according to claim 7, wherein the determining a color of text to be inputted into the text frame based on the average luminance value of the subimage comprises:
setting, in response to determining the average luminance value of the subimage being greater than a preset threshold, the color of the text to be inputted into the text frame as black; and
setting, in response to determining the average luminance value of the subimage being less than or equal to the preset threshold, the color of the text to be inputted into the text frame as white.

12. The apparatus according to claim 7, wherein the determining a subimage corresponding to the text frame from the canvas comprises:
determining a position of at least one vertex of the text frame on the canvas;
acquiring a length and a width of the text frame; and
determining the subimage from the canvas based on the determined position of the at least one vertex, the length, and the width.

13. A non-transitory computer readable medium, storing a computer program thereon, wherein the computer program, when executed by a processor, causes the processor to perform operations, the operations comprising:
determining, in response to detecting a text frame on canvas, a subimage corresponding to the text frame from the canvas;
acquiring color values of pixels in the subimage, to determine an average color value of the subimage;
determining an average luminance value of the subimage based on the average color value of the subimage;

determining a color of text to be inputted into the text frame based on the average luminance value of the subimage;

detecting whether the canvas is replaced in real time; and resetting, in response to detecting the canvas being replaced, a color of the text to be inputted into the text frame.

14. The non-transitory computer readable medium according to claim 13, wherein the operations further comprises:

acquiring element information of a DOM node of the subimage to generate an XML document;

creating an SVG template of a specified size, wherein the specified size is a size of the subimage; and analyzing the XML document using the XML document as content of the SVG template, to generate a vectorgraph of the subimage.

15. The non-transitory computer readable medium according to claim 14, wherein the operations further comprises:

creating canvas of the specified size; and plotting the vectorgraph onto the created canvas to acquire the color values of the pixels in the subimage.

16. The non-transitory computer readable medium according to claim 13, wherein the determining a color of text to be inputted into the text frame based on the average luminance value of the subimage comprises:

acquiring a preset contrast, wherein the contrast is a contrast between the text and the subimage;

determining a luminance value of the text based on the average luminance value of the subimage and the contrast; and determining a gray value of the text based on the determined luminance value of the text.

17. The non-transitory computer readable medium according to claim 13, wherein the determining a color of text to be inputted into the text frame based on the average luminance value of the subimage comprises:

setting, in response to determining the average luminance value of the subimage being greater than a preset threshold, the color of the text to be inputted into the text frame as black; and setting, in response to determining the average luminance value of the subimage being less than or equal to the preset threshold, the color of the text to be inputted into the text frame as white.

18. The non-transitory computer readable medium according to claim 13, wherein the determining a subimage corresponding to the text frame from the canvas comprises:

determining a position of at least one vertex of the text frame on the canvas;

acquiring a length and a width of the text frame; and determining the subimage from the canvas based on the determined position of the at least one vertex, the length, and the width.

\* \* \* \* \*